(12) United States Patent
Krenz

(10) Patent No.: US 9,098,374 B2
(45) Date of Patent: Aug. 4, 2015

(54) VERSION CONTROL FOR SOFTWARE CONFIGURABLE AIRCRAFT SYSTEMS

(71) Applicant: Hamilton Sundstrand Corporation, Windsor Locks, CT (US)

(72) Inventor: Michael Krenz, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 125 days.

(21) Appl. No.: 13/775,755

(22) Filed: Feb. 25, 2013

(65) Prior Publication Data

US 2014/0245285 A1 Aug. 28, 2014

(51) Int. Cl.
*G06F 9/44* (2006.01)
*G06F 9/445* (2006.01)

(52) U.S. Cl.
CPC ... *G06F 8/65* (2013.01); *G06F 8/60* (2013.01); *G06F 8/66* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,159,329 | B1* | 4/2012 | Killian et al. | 340/8.1 |
| 8,387,112 | B1* | 2/2013 | Ranjan et al. | 726/2 |
| 2002/0140966 | A1* | 10/2002 | Meade et al. | 358/1.15 |
| 2004/0164140 | A1* | 8/2004 | Voeller et al. | 235/375 |
| 2005/0065670 | A1* | 3/2005 | Tripmaker | 701/3 |
| 2005/0154904 | A1* | 7/2005 | Perepa et al. | 713/193 |
| 2005/0170827 | A1* | 8/2005 | Nagashima | 455/419 |
| 2006/0101449 | A1* | 5/2006 | Gatz | 717/168 |
| 2006/0101451 | A1* | 5/2006 | Fong | 717/168 |
| 2006/0130046 | A1* | 6/2006 | O'Neill | 717/168 |
| 2007/0114280 | A1* | 5/2007 | Coop et al. | 235/385 |
| 2007/0275735 | A1* | 11/2007 | Estevez | 455/457 |
| 2008/0184151 | A1* | 7/2008 | Agarwal et al. | 715/772 |
| 2009/0138872 | A1* | 5/2009 | Fuchs et al. | 717/173 |
| 2009/0300595 | A1* | 12/2009 | Moran et al. | 717/170 |
| 2010/0070966 | A1* | 3/2010 | Perng et al. | 717/173 |
| 2010/0235289 | A1* | 9/2010 | Frayssignes et al. | 705/304 |
| 2011/0167420 | A1* | 7/2011 | Bastien | 717/173 |
| 2012/0036552 | A1* | 2/2012 | Dare et al. | 726/1 |
| 2013/0067450 | A1* | 3/2013 | Saugnac | 717/170 |
| 2014/0059534 | A1* | 2/2014 | Daum et al. | 717/172 |

(Continued)

OTHER PUBLICATIONS

Alena, R.L.; Ossenfort, J.P.; Laws, K.I.; Goforth, A.; Figueroa, F., Communications for Integrated Modular Avionics, [Online] Mar. 3-10, 2007, Aerospace Conference, 2007 IEEE, [Retrieved from the Internet] <http://ieeexplore.ieee.org/stamp/stamp.jsp?tp=&arnumber=4161517&isnumber=4144550> pp. 1-18.*

(Continued)

*Primary Examiner* — Thuy Dao
*Assistant Examiner* — Ravi K Sinha
(74) *Attorney, Agent, or Firm* — Kinney & Lange, P.A.

(57) ABSTRACT

A software version control system and method includes installing a software configurable component on an aircraft, automatically setting a listen switch of the software configurable component to an on state upon installation of the software configurable component in a new installation location, listening for a software version from a configuration manager on a communication bus, turning off the listen switch if a software version of the software configurable component matches the software version of the configuration manager, and downloading an updated software version to the software configurable component if the software version of the software configurable component does not match the software version of the configuration manager.

10 Claims, 4 Drawing Sheets

(56) References Cited

U.S. PATENT DOCUMENTS

| | | | |
|---|---|---|---|
| 2014/0109075 A1* | 4/2014 | Hoffman et al. | 717/169 |
| 2014/0231505 A1* | 8/2014 | King et al. | 235/375 |
| 2014/0310186 A1* | 10/2014 | Ricci | 705/302 |
| 2015/0100774 A1* | 4/2015 | Lopez et al. | 713/100 |

OTHER PUBLICATIONS

Watkins, C.B., Integrated Modular Avionics: Managing the Allocation of Shared Intersystem Resources, [Online] Oct. 15-19, 2006, 25th Digital Avionics Systems Conference, 2006 IEEE/AIAA, [Retrieved from the Internet] <http://ieeexplore.ieee.org/stamp/stamp.jsp?tp=&arnumber=4106349&isnumber=4106228> pp. 1-12.*

S.M. Ellis, Dynamic software reconfiguration for fault-tolerant real-time avionic systems, [Online] 1997, Microprocessors and Microsystems, vol. 21, Issue 1, Jul. 1997, [Retrieved from the Internet] <http://www.sciencedirect.com/science/article/pii/S0141933197000173> pp. 29-39.*

\* cited by examiner

VERSION CONTROL FOR SOFTWARE CONFIGURABLE AIRCRAFT SYSTEMS

BACKGROUND

Aircraft systems include software configurable components. These components often come in the form of mechanical boxes that contain electronics capable of processing and storing data, and commanding outputs. Such boxes include generator control units (GCUs), bus power control units (BPCUs), and various avionics systems. Varying versions of software may be available for a given box, but the software loaded on each box must be compatible with the other systems onboard the aircraft. Because of this, incompatibilities can arise if a unit is installed on an aircraft with a version of software that does not match that of the other systems onboard the aircraft.

An onboard file system may contain the current software versions for all of the software loadable boxes of the aircraft. Many of the loadable boxes can listen on a communications bus for the appropriate aircraft identifiers and software versions before commanding outputs or states to the aircraft. However, a box that lies in the power path of the aircraft may be responsible for commanding power to the onboard file system. It may not be safe to power the onboard file system through the power path box without first knowing the aircraft identifiers and current software versions. However, the onboard file system cannot provide identifiers and software versions to the power path box until it has been powered. This makes it difficult to automate the version compatibility check process when a box in the power path is installed.

SUMMARY

A software version control system and method includes installing a software configurable component on an aircraft, automatically setting a listen switch of the software configurable component to an on state upon installation of the software configurable component in a new installation location, listening for a software version from a configuration manager on a communication bus, turning off the listen switch if a software version of the software configurable component matches the software version of the configuration manager, and downloading an updated software version to the software configurable component if the software version of the software configurable component does not match the software version of the configuration manager.

DETAILED DESCRIPTION

The present invention is related to aircraft electronics, and in particular to version control for software loadable components of an aircraft. Software loadable components, often in the form of mechanical boxes containing software loadable electronics, include a listen switch. These boxes may include, for example, a generator control unit (GCU), a bus power control unit (BPCU), avionics, or any other software loadable electronics onboard an aircraft. When the listen switch is set to an on state, the box will power itself and listen on an aircraft communication bus for aircraft identifiers and a current software version from a configuration manager. Once the box has received the current software version, it checks its own software version to determine if they match. If they match, the box reports its configuration to the configuration manager and the listen switch is set to an off state. If they do not match, the box downloads the current software from the configuration manager. Once the current software is installed, the box reports its configuration to the configuration manager and the listen switch is set to an off state. The setting of the state of the switch may be automated using radio frequency identification (RFID) tags and readers. Each box may contain an RFID reader, and each installation location may include a unique RFID tag. When installed, the RFID reader of the box reads the RFID tag and stores the tag identifier. If the tag identifier does not match the most recent previously read tag identifier, the box sets the listen switch to an on state. If the tag matches, the box keeps the listen switch in the off state.

Figure 1:
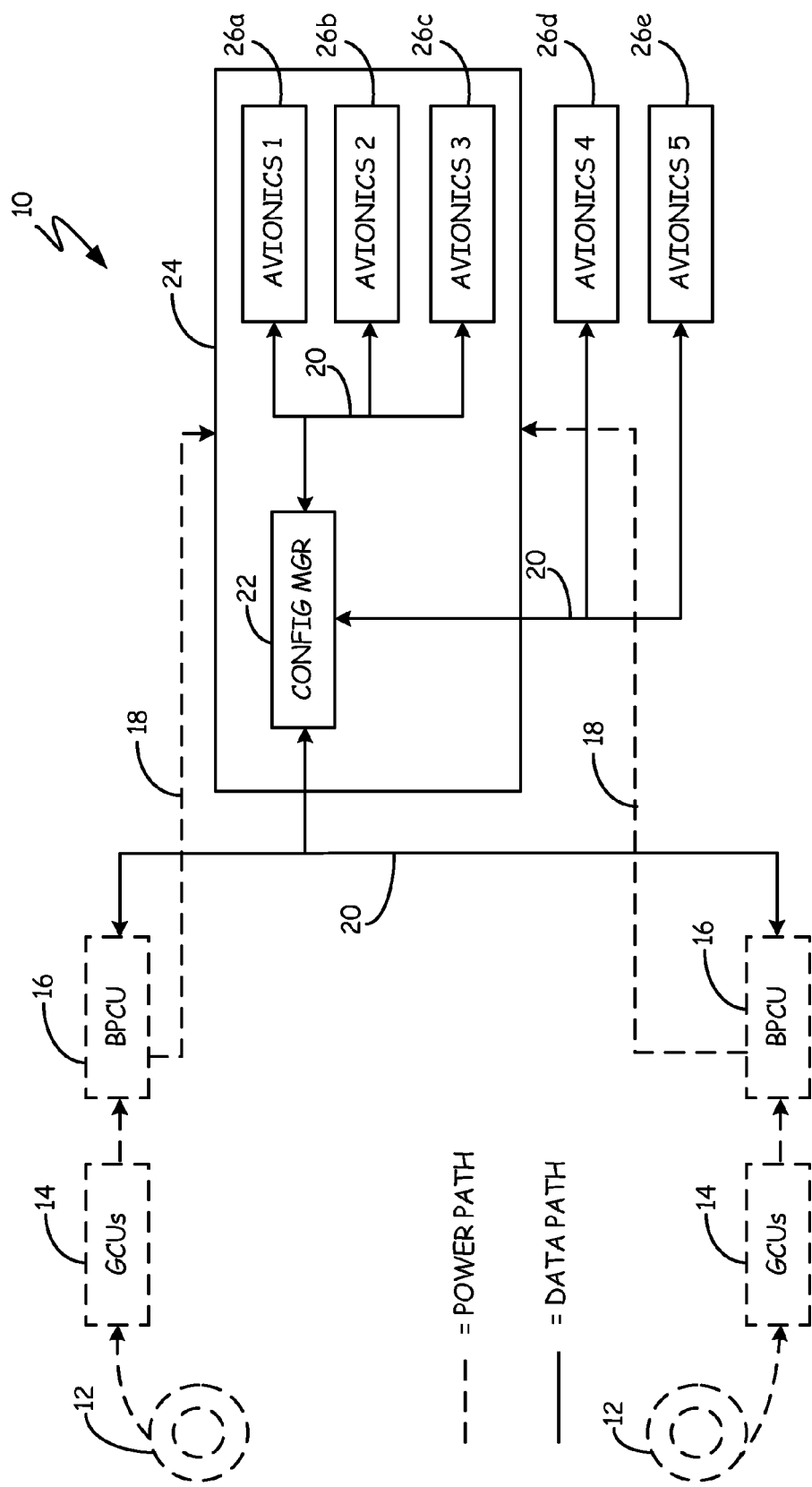
FIG. 1 is a block diagram illustrating an aircraft system that utilizes listen switches for version control.

FIG. 1 is a block diagram illustrating aircraft system 10 that utilizes listen switches for version control of aircraft electronics. System 10 includes power sources 12, generator control units (GCUs) 14, bus power control units (BPCUs) 16, power path 18, communication bus 20, configuration manager 22, computing system 24, and avionics 26a-26e. Power sources 12 are any main aircraft power sources such as, for example, primary engine generators or auxiliary power units (APUs). Power from sources 12 is controlled by GCUs 14 and BPCUs 16. Power is provided to aircraft systems on power path 18, which is any known aircraft power distribution system. Computing system 24 is any central computing system for an aircraft, such as, for example, a common core system (CCS). Configuration manager 22, as well as some of the avionics, may be included in computing system 24. Computing system 24, and all systems included in computing system 24, are powered by power path 18. Avionics 26a-26e are any known aircraft avionics systems, such as communications systems, navigation systems, flight control systems, or any other known avionics systems. In the present embodiment, GCUs 14, BPCUs 16, and avionics 26a-26e are all software configurable boxes. Software configurable boxes may be mechanical boxes that include electronics capable of executing instructions, processing and storing data, and commanding outputs. Software for these boxes is loadable and can be updated at any time, and may be delivered on, for example, communications bus 20. Communication bus 20 is any known aircraft communication bus.

Configuration manager 22 may also be a software loadable box, and stores information relating to the aircraft such as, for example, aircraft identifiers indicating, among other things, the aircraft model, and all current software configurations for each of the software loadable boxes. In order to ensure compatibility between aircraft systems, each software configurable box must run a compatible version of software.

Each software configurable box includes a listen switch, which may be mechanical, electrical, or any other known type of switch. When the listen switch is set to the on state, the software configurable box powers itself up and listens on communication bus 20 for a current software version from configuration manager 22. While the switch is in the on state, the software configurable box does not command any outputs. Configuration manager 22 broadcasts the aircraft identifiers and current software version to the software configurable box on communication bus 20. If the software version from configuration manager 22 matches the software version of the software configurable box, the box will report its configuration to the configuration manager on communication bus 20. The box then sets the listen switch to an off state, and the software configurable box can start commanding outputs. If the software version from configuration manager 22 does not match the software version of the software configurable box, the software configurable box downloads the current software from configuration manager 22 on communication bus 20. Following download and installation of the software to the software configurable box, the box reports its configuration to configuration manager 22 on communication bus 20. The box then sets the listen switch to the off state and the software configurable box can begin commanding outputs.

Following this process allows boxes in the power path, such as GCUs 14 and BPCUs 16, to safely power up and listen for a current software version from configuration manager 22, without commanding power to configuration manager 22. In the event that all GCUs 14, or all BPCUs 16 are installed at the same time, manual override buttons may be installed on the software configurable boxes to force power up upon installation. This button would be used by an installation technician to override the listen switch, setting it to the off position, upon knowing that the box contains the proper software version. This way, the box may command power to configuration manager 22, and all other boxes may proceed using their respective listen switches.

Figure 2A:
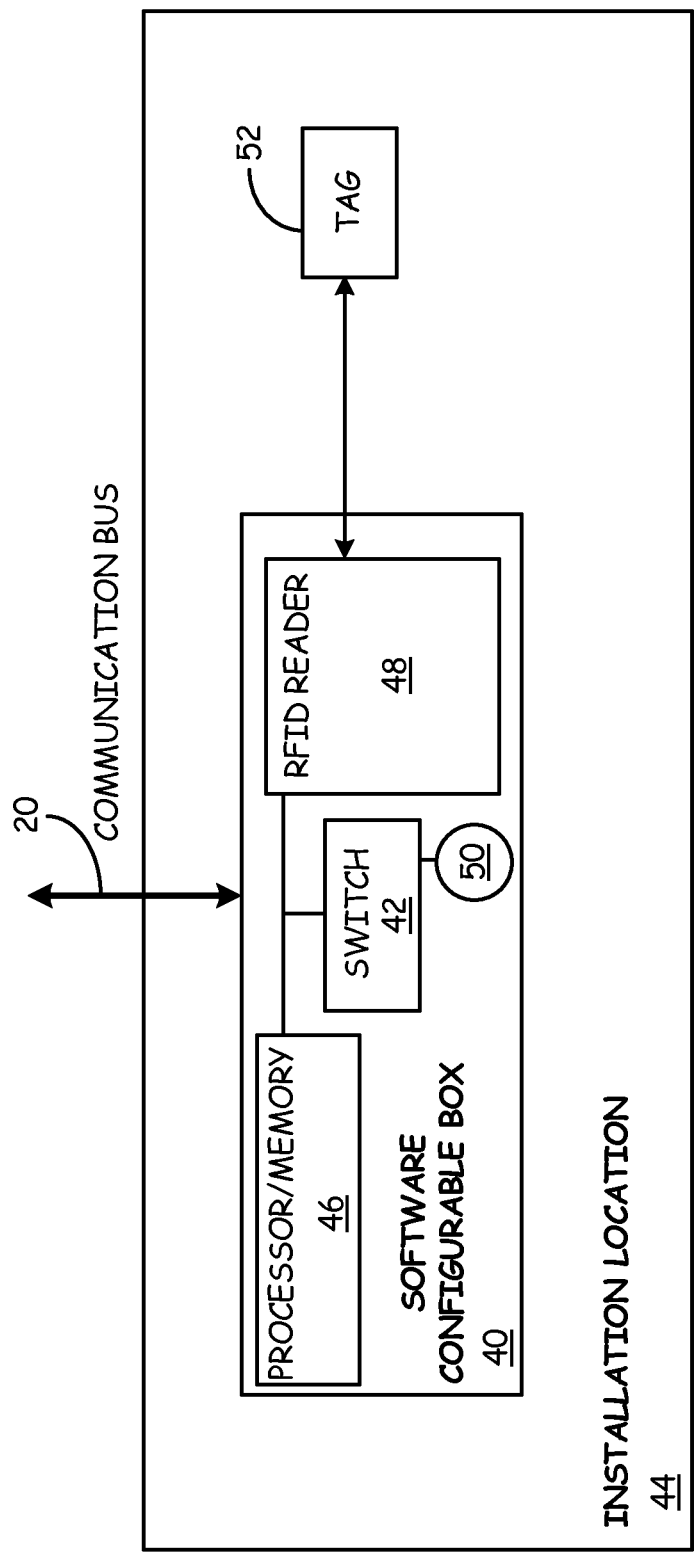
FIGS. 2A and 2B are block diagrams illustrating software configurable boxes that include listen switches for version control.

FIG. 2A is a block diagram illustrating software configurable box 40 that includes listen switch 42 for version control. Each software configurable box 40 is installed in an installation location 44 which may be a machine rack or mount, or any other location in which software configurable box 40 may reside following installation. In one embodiment, software configurable box 40 includes listen switch 42, processor/memory 46, RFID reader 48, and manual override button 50. Processor/memory 46 is any electronic module capable of executing instructions and storing data. RFID reader 48 is any device capable of interrogating and obtaining information from RFID tag 52. RFID tag 52 is any tag such as, for example, a passive RFID tag. In another embodiment, RFID reader 48 may be a radio-frequency transceiver that receives an aircraft identifier transmitted by a computer system onboard the aircraft. In this embodiment, RFID tag 52 would not be necessary.

Upon installation of software configurable box 40 into installation location 44, RFID reader will interrogate RFID tag 52. RFID tag 52 includes a unique identifier which is read by RFID reader 48 and provided to processor/memory unit 46. Processor/memory unit 46 stores this identifier in, for example, a non-volatile memory each time software configurable box 40 is installed and the configuration is verified as correct for the aircraft. The present identifier is compared by processor/memory unit 46 with the most recent previously stored identifier.

If no identifiers were previously stored, or the previously stored identifier does not match the present identifier, processor/memory unit sets switch 42 to an on state. Switch 42 is any known switch and may be implemented as a mechanical switch or an electronic switch. When switch 42 is set to the on state, processor/memory unit 46 listens for aircraft identifiers and software versions on communication bus 20. When processor/memory unit 46 receives the current software versions on communication bus 20, processor/memory unit 46 compares its software version with the received software version. If the software versions match, processor/memory unit 46 reports its configuration on communication bus 20, and sets listen switch 42 to the off state. If the software versions do not match, processor/memory unit 46 requests and downloads a software update on communication bus 20. Once the software update has been received and installed, processor/memory unit 46 reports its configuration on communication bus 20, and sets listen switch 42 to the off state. When listen switch 42 is in the off state, software configurable box 40 is free to command any outputs or states to the rest of the aircraft.

Manual override button 50 is included to allow a technician to manually override listen switch 42. If, for example, software configurable box 40 is a power path box, and a configuration manager cannot be powered otherwise without receiving power commanded from software configurable box 40, a technician that has verified that software configurable box 40 contains the proper software may use manual override button 50. Manual override button 50 may either set listen switch 42 to the off position, or may indicate to processor/memory 46 to ignore listen switch 42.

In another embodiment, RFID reader 48 may instead be a radio-frequency transceiver that receives an aircraft identifier transmitted by a computer system onboard the aircraft. Upon installation of software configurable box 40, radio-frequency transceiver 48 would receive a unique aircraft identifier from the aircraft. Processor/memory 46 may determine if software configurable box 40 has been installed in a new location and control listen switch 42 accordingly. In this embodiment, RFID tag 52 would not be necessary.

Figure 2B:
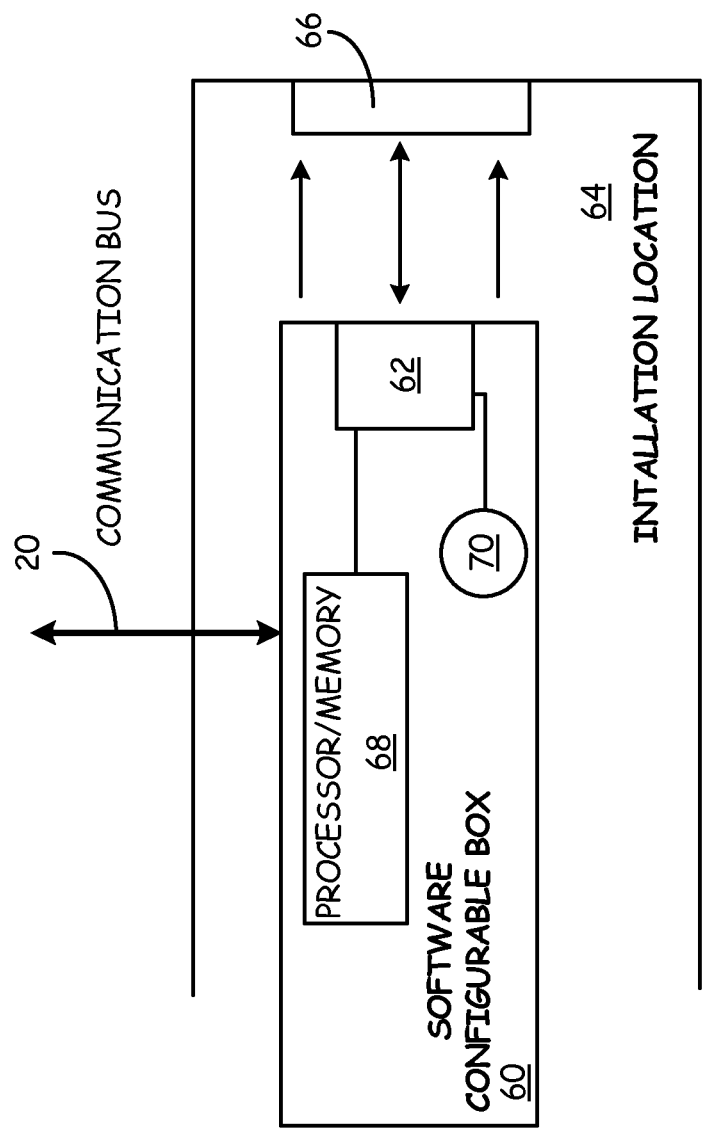

FIG. 2B is a block diagram illustrating a software configurable box 60 that automatically sets listen switch 62 upon installation in installation location 64. Listen switch 62 is automatically set to the on state by switch activator 66 when box 60 is installed. In one embodiment, switch activator 66 may be mechanical. Switch activator 66 may be a trip latch that sets switch 62 to an on state mechanically when box 60 is installed. In another embodiment, switch activator 66 may electronically set switch 62 to an on state upon installation of box 60. In this case, box 60 may include a sensor to detect switch activator 66, or switch activator 66 may come into electrically contact with switch 62 upon installation.

When switch 62 is set to the on state, processor/memory unit 68 listens for aircraft identifiers and software versions on communication bus 20. When processor/memory unit 68 receives the current software versions on communication bus 20, processor/memory unit 68 compares its software version with the received software version. If the software versions match, processor/memory unit 68 reports its configuration on communication bus 20. If the software versions do not match, processor/memory unit 68 requests and downloads a software update on communication bus 20. Once the software update has been received and installed, processor/memory unit 68 reports its configuration on communication bus 20. After the configuration has been reported on communication bus 20, listen switch 62 may be set to the off state by processor/memory unit 68, or may be manually set to the off state using an input 70. When listen switch 62 is in the off state, software configurable box 60 is free to command any outputs or states to the rest of the aircraft.

Figure 3:
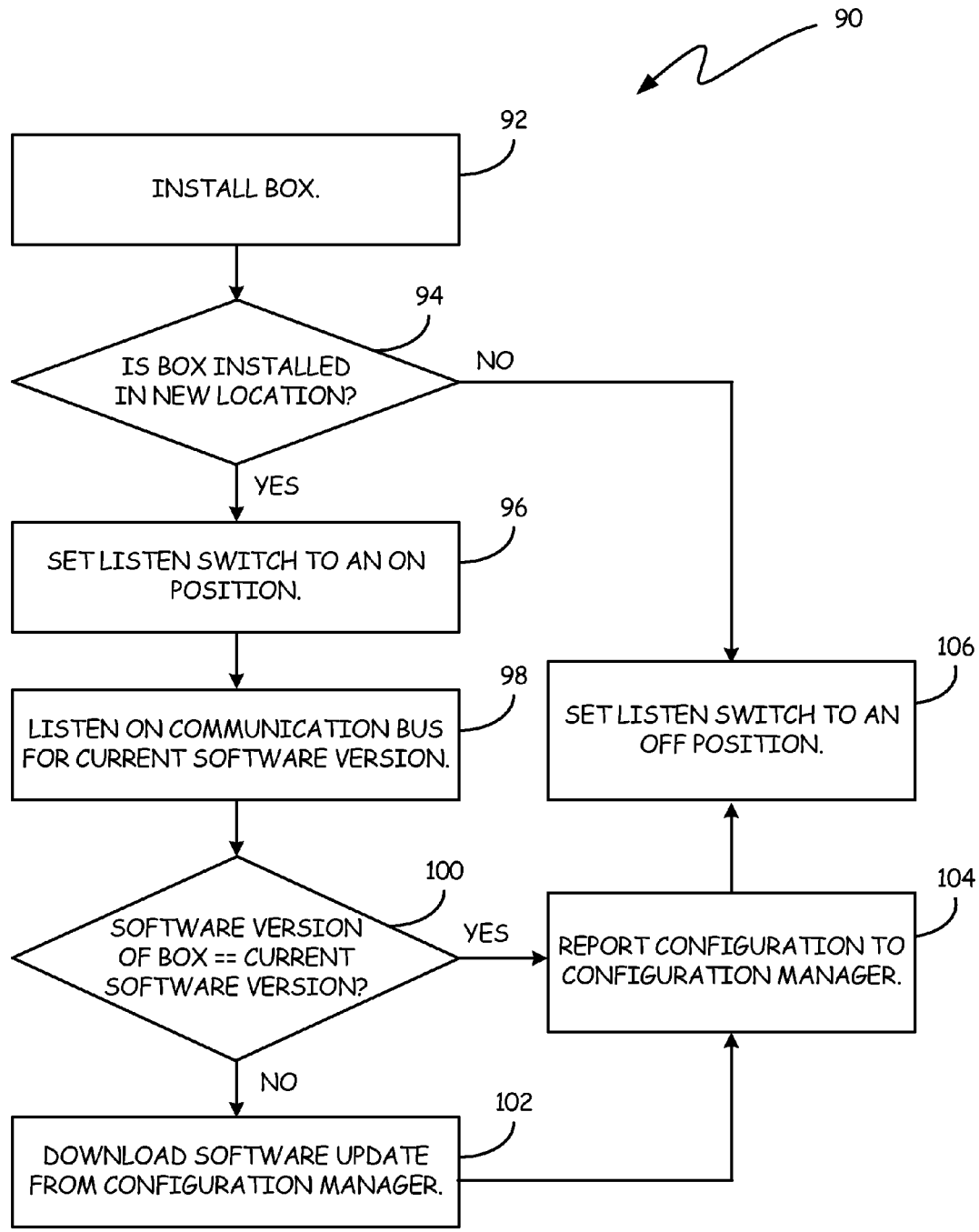
FIG. 3 is a flowchart illustrating a method of using listen switches for version control of aircraft systems.

FIG. 3 is a flowchart illustrating method 90 of using listen switches for version control of aircraft software configurable components. At step 92, a software configurable component such as boxes BPCUs 16 are installed onboard an aircraft. At step 94, it is determined if the box is installed in a new location. This may be accomplished, for example, using RFID reader 48 to interrogate RFID tag 52 of FIG. 2. If the box is installed in a new location, method 90 proceeds to step 96. If the box is not installed in a new location, method 90 proceeds to step 106. At step 96, the listen switch of the installed box is set to an on state. At step 98, the installed box listens on the communication bus for aircraft identifiers and a current software version from the configuration manager. At step 100, the software version of the installed box is compared to the software version provided by the configuration manager. If the versions do not match, method 90 proceeds to step 102. If the versions match, method 90 proceeds to step 104. At step 102, updated software is downloaded to the installed box. At step 104, the installed box reports its configuration to the configuration manager. At step 106, the listen switch of the installed box is set to an off state.

The following are non-exclusive descriptions of possible embodiments of the present invention.

A software version control method includes, among other things: installing a software configurable component on an aircraft, automatically setting a listen switch of the software configurable component to an on state upon installation of the software configurable component in a new installation location, listening for a software version from a configuration manager on a communication bus, turning off the listen switch if a software version of the software configurable component matches the software version of the configuration manager, and downloading an updated software version to the software configurable component if the software version of the software configurable component does not match the software version of the configuration manager.

The method of the preceding paragraph can optionally include, additionally and/or alternatively, any one or more of the following features, configurations and/or additional components:

Turning off the listen switch after the updated software version has been downloaded by the software configurable component.

Turning off the listen switch includes reporting a current configuration of the software configurable component to the configuration manager on the communication bus.

Automatically setting a listen switch of the software configurable component to an on state includes reading an RFID tag associated with the installation location to obtain a location tag value, comparing a previously read tag value with the location tag value, and setting the listen switch to the on state if the previously read tag value does not match the location tag value.

Manually setting the listen switch to an on state if no previous tag value has been read by the software configurable component.

The software configurable component is located in a power path between a power source and the configuration manager.

Automatically setting the listen switch of the software configurable component to the on state includes automatically setting the listen switch to the on state using a mechanical switch activator located at the installation location.

Turning off the listen switch includes manually turning off the listen switch if a software version of the software configurable component matches the software version of the configuration manager.

A software version control system includes, among other things: a configuration manager that stores a current software version, a software configurable component that includes a listen switch that is automatically set to an on state upon installation of the software configurable component, and a communication bus connected between the configuration manager and the software configurable component. The software configurable component listens for the current software version when the listen switch is set to the on state. The software configurable component downloads a software update from the configuration manager if the current software version does not match a software version of the software configurable component when the listen switch is set to the on state.

The system of the preceding paragraph can optionally include, additionally and/or alternatively, any one or more of the following features, configurations and/or additional components:

The software configurable component also includes an RFID reader that interrogates an RFID tag upon installation of the software configurable component to receive a new unique identifier, a memory that holds a previous unique identifier, and a processor that compares the new unique identifier with the previous unique identifier. The processor sets the listen switch to the on state if the new unique identifier is different than the previous unique identifier.

The software configurable component also includes a manual override button that sets the listen switch to an off state.

The listen switch is automatically set to the on state upon installation of the software configurable component using a mechanical switch activator.

The software configurable component sets the listen switch to the off state if the current software version matches the software version of the configurable component.

After the software configurable component downloads the software update, the software configurable component installs the software update and sets the listen switch to the off state.

A software configurable box for an aircraft includes, among other things: an RFID reader that interrogates an RFID tag upon installation of the software configurable box to receive a new unique identifier, a memory that holds a previous unique identifier, a processor that compares the new unique identifier with the previous unique identifier, and a listen switch that is set to an on state if the new unique identifier does not match the previous unique identifier. The software configurable box listens on a communication bus for a current software version when the listen switch is set to the on state.

The software configurable box of the preceding paragraph can optionally include, additionally and/or alternatively, any one or more of the following features, configurations and/or additional components:

A manual override button that sets the listen switch to the an off state.

The processor sets the listen switch to an off state if the current software version matches a software version installed on the processor.

The processor downloads a software update from the communication bus if the current software version does not match a software version installed on the processor when the listen switch is set to the on state.

After the processor downloads the software update, the processor installs the software update and sets the listen switch to the off state.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A software version control method comprising:
installing a software configurable component on an aircraft;

automatically setting a listen switch of the software configurable component to an on state upon installation of the software configurable component in a new installation location, wherein the software configurable component does not command power outputs to a configuration manager on a power path while the listen switch is in the on state and wherein automatically setting the listen switch of the software configurable component to an on state comprises:
  reading a radio frequency identification (RFID) tag associated with the installation location to obtain a location tag value;
  comparing a previously read tag value with the location tag value; and
  setting the listen switch to the on state if the previously read tag value does not match the location tag value;
manually setting the listen switch to an on state if no previous tag value has been read by the software configurable component;
listening for a software version from the configuration manager on a communication bus;
turning off the listen switch if a software version of the software configurable component matches the software version of the configuration manager; and
downloading an updated software version to the software configurable component if the software version of the software configurable component does not match the software version of the configuration manager.

2. The method of claim 1, further comprising turning off the listen switch after the updated software version has been downloaded by the software configurable component.

3. The method of claim 1, wherein turning off the listen switch comprises reporting a current configuration of the software configurable component to the configuration manager on the communication bus.

4. The method of claim 1, wherein the software configurable component is located in a power path between a power source and the configuration manager.

5. The method of claim 1, wherein automatically setting the listen switch of the software configurable component to the on state comprises automatically setting the listen switch to the on state using a mechanical switch activator located at the installation location.

6. The method of claim 5, wherein turning off the listen switch comprises manually turning off the listen switch if a software version of the software configurable component matches the software version of the configuration manager.

7. A software version control system comprising:
  a central processing unit (CPU);
  a configuration manager that stores a current software version;
  a software configurable component that includes a listen switch, wherein the listen switch is automatically set to an on state upon installation of the software configurable component;
  a communication bus connected between the configuration manager and the software configurable component, wherein the software configurable component listens for the current software version when the listen switch is set to the on state, and wherein the software configurable component does not command power outputs to the configuration manager on a power path while the listen switch is in the on state;
  wherein the software configurable component further comprises:
    a radio frequency identification (RFID) reader that interrogates an RFID tag upon installation of the software configurable component to receive a new unique identifier;
    a memory that holds a previous unique identifier;
    a processor that compares the new unique identifier with the previous unique identifier, wherein the processor sets the listen switch to the on state if the new unique identifier is different than the previous unique identifier; and
    a manual override button that sets the listen switch to an off state;
  wherein the software configurable component downloads a software update from the configuration manager if the current software version does not match a software version of the software configurable component when the listen switch is set to the on state.

8. The software version control system of claim 7, wherein the listen switch is automatically set to the on state upon installation of the software configurable component using a mechanical switch activator.

9. The software version control system of claim 7, wherein the software configurable component sets the listen switch to the off state if the current software version matches the software version of the configurable component.

10. The software version control system of claim 7, wherein after the software configurable component downloads the software update, the software configurable component installs the software update and sets the listen switch to the off state.

* * * * *